United States Patent
Kizhepat (10) Patent No.: US 7,263,108 B2
(45) Date of Patent: Aug. 28, 2007

(54) DUAL-MODE NETWORK STORAGE SYSTEMS AND METHODS

(75) Inventor: Govind Kizhepat, Sunnyvale, CA (US)

(73) Assignee: NetXen, Inc., Santa Clara, CA (US)

( * ) Notice: Subject to any disclaimer, the term of this patent is extended or adjusted under 35 U.S.C. 154(b) by 1073 days.

(21) Appl. No.: 10/213,237

(22) Filed: Aug. 6, 2002

(65) Prior Publication Data

US 2004/0028068 A1  Feb. 12, 2004

(51) Int. Cl.
*H04J 3/24* (2006.01)
(52) U.S. Cl. .................. 370/473; 370/534; 370/537
(58) Field of Classification Search .............. None
See application file for complete search history.

(56) References Cited

U.S. PATENT DOCUMENTS

| | | | |
|---|---|---|---|
| 5,809,285 A | 9/1998 | Hilland | 703/25 |
| 5,941,972 A | 8/1999 | Hoese et al. | 710/129 |
| 6,065,096 A | 5/2000 | Day et al. | 711/114 |
| 6,209,023 B1 | 3/2001 | Dimitroff et al. | 709/211 |
| 6,282,610 B1 | 8/2001 | Bergsten | 711/114 |
| 6,295,575 B1 | 9/2001 | Blumenau et al. | 711/5 |
| 6,295,578 B1 | 9/2001 | Dimitroff et al. | 711/114 |
| 6,351,838 B1 | 2/2002 | Amelia | 714/770 |
| 6,363,462 B1 | 3/2002 | Bergsten | 711/162 |
| 6,400,730 B1 | 6/2002 | Latif et al. | 370/466 |
| 7,020,888 B2 * | 3/2006 | Reynolds et al. | 725/34 |
| 2001/0037406 A1 * | 11/2001 | Philbrick et al. | 709/250 |
| 2002/0049825 A1 | 4/2002 | Jewett et al. | 709/215 |
| 2002/0083120 A1 * | 6/2002 | Soltis | 709/200 |
| 2002/0129216 A1 | 9/2002 | Collins | 711/170 |
| 2003/0208638 A1 * | 11/2003 | Abrams et al. | 709/328 |

\* cited by examiner

*Primary Examiner*—Chi Pham
*Assistant Examiner*—Thai Hoang
(74) *Attorney, Agent, or Firm*—Law Office of Andrei D. Popovici, P.C.

(57) ABSTRACT

A dual-mode network storage controller integrated on a chip is connected to a first set of hosts over a block-level storage area network (SAN), and to a second set of hosts over a metadata Ethernet/IP network. The dual-mode storage controller is also connected to one or more storage devices, such as a Redundant Array of Independent Disks (RAID). The storage controller comprises dedicated-hardware metadata translation logic for translating metadata (e.g. file-level) storage commands into block-level storage commands. The storage controller can also include block translation logic for translating logical block-level storage commands into physical block-level storage commands. The storage controller further comprises multiplexing logic for sequentially transmitting to the storage device(s) block level storage commands derived from the commands received from the first set of hosts and the second set of hosts. The storage controller allows the first set of hosts and the second set of hosts to share a single storage device.

28 Claims, 5 Drawing Sheets

DUAL-MODE NETWORK STORAGE SYSTEMS AND METHODS

FIELD OF THE INVENTION

The invention in general relates to storage networks, and in particular to systems and methods for controlling the storage of data over networks.

BACKGROUND

Network storage systems have grown in importance with the growth in the storage needs of enterprise and Internet computer systems. Dedicated storage area networks (SAN) and network attached storage (NAS) file servers have been proposed as alternative approaches for handling increasing computer storage needs.

Storage area networks use block-level semantics. Storage devices such as RAID (Redundant Array of Independent/Inexpensive Disks) devices are connected to various hosts over a dedicated storage network employing a block-level protocol such as Fibre Channel. SANs are typically very efficient for storing large amounts of data. At the same time, the SAN storage approach requires building a dedicated network, which may not be cost-effective if the amount of data to be stored is not sufficiently large.

NAS file servers employ file-level semantics to communicate with their corresponding hosts. The computer hosts are typically connected to one or more NAS file servers over a conventional Ethernet local area network (LAN). The storage operations share the general bandwidth available over the LAN, and thus may slow down the non-storage LAN traffic. The NAS file server receives file-level data from the hosts, and generates the block-level commands needed by the storage devices attached locally to the NAS file server. NAS does not require building a relatively expensive separate network dedicated to storage. At the same time, the performance of NAS systems is often inferior to that of dedicated SANs, particularly for storing large amounts of data.

SAN and NAS have been typically viewed as alternative storage approaches. The same network cannot typically handle efficiently both file-level and block-level data. Thus, system users desiring to use both SAN and NAS usually employ separate networks and associated storage devices for each storage approach.

SUMMARY OF THE INVENTION

The present invention provides a dual-mode network storage control apparatus integrated on a chip, comprising: an input metadata network interface for receiving a metadata storage command from a first network client; metadata translation logic connected to the input metadata network interface, for translating the metadata storage command into a corresponding first block storage command; an input block network interface for receiving a second block storage command from a second network client; a multiplexing unit having a first input connected to the metadata translation logic for receiving the first block storage command, a second input connected to the input block network interface for receiving the second block storage command, and a multiplexing unit output for selectively transmitting the first block storage command and the second block storage command; and an output block interface connected to the multiplexing unit output, for receiving the first block storage command and the second block storage command from the multiplexing unit output and transmitting the first block storage command and the second block storage command.

BRIEF DESCRIPTION OF THE DRAWINGS

The foregoing aspects and advantages of the present invention will become better understood upon reading the following detailed description and upon reference to the drawings where:

FIG. 2-A shows the structure of a dual-mode network storage controller according to the preferred embodiment of the present invention.

FIG. 2-B is a flowchart illustrating the operation of the file translation and block translation units of the dual-mode network storage controller of FIG. 2-A, according to the preferred embodiment of the present invention.

FIGS. 4-A-C show dual-mode network storage controllers according to three embodiments of the present invention.

DETAILED DESCRIPTION OF THE INVENTION

In the following description, it is understood that all recited connections between structures can be direct connections or indirect connections through intermediary structures. The term "medatata" encompasses file, URL (Universal Resource Locator), XML (Extensible Markup Language), and other high-level data, as opposed to block-level data. A metadata connection is a connection carrying metadata and/or commands (e.g. read or write) for manipulating metadata. A metadata connection is distinct from a block connection carrying block-level data, such as a Fibre Channel (FC) connection. Any reference to an element is understood to encompass one or more elements. A set of elements is understood to include one or more elements. A second command or data derived from a first command/data can be identical to the first command/data, or generated by processing the first command/data and possibly other data.

The following description illustrates embodiments of the invention by way of example and not necessarily by way of limitation.

Figure 1:
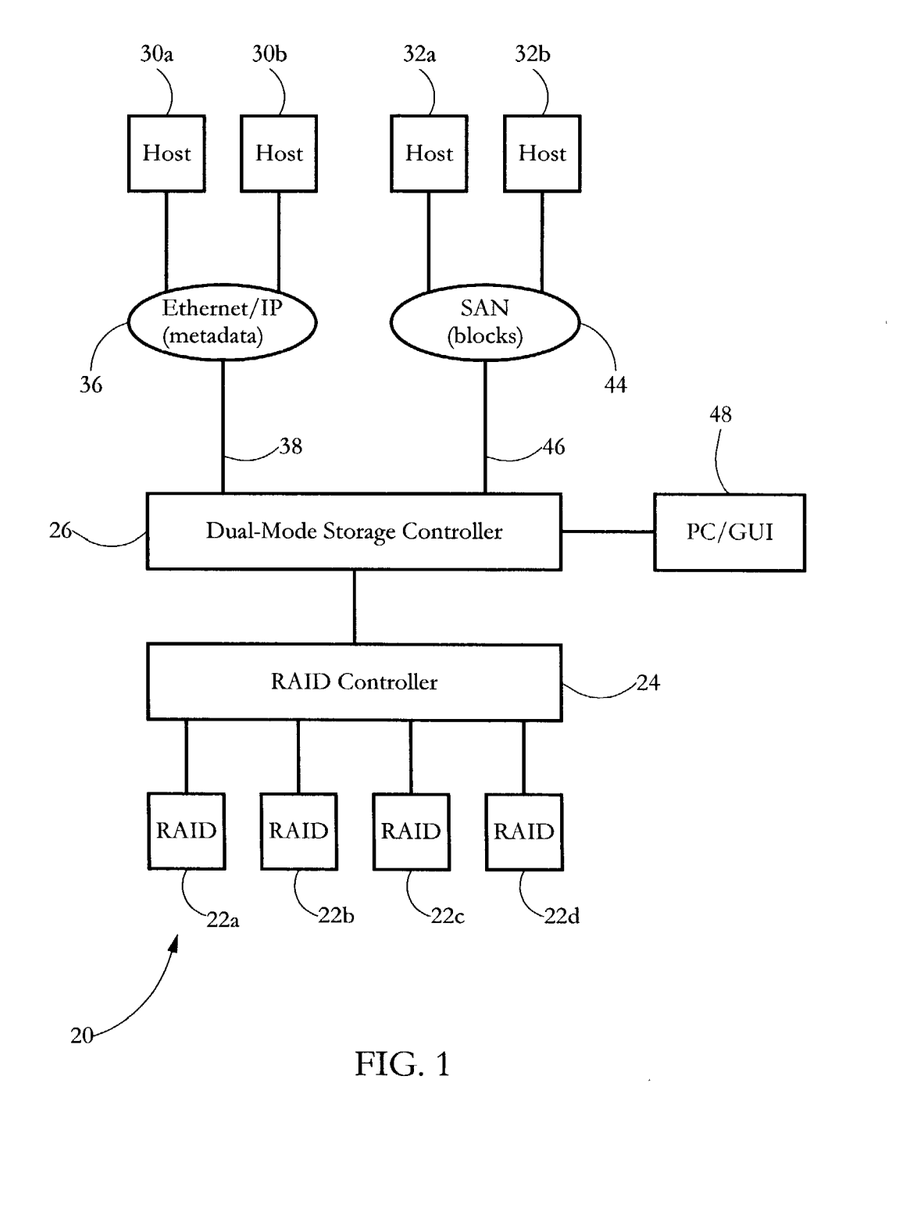
FIG. 1 is a schematic diagram of an exemplary storage network according to the preferred embodiment of the present invention.

FIG. 1 shows a schematic illustration of a network storage system 20, including an environment of a special-purpose dual-mode storage control apparatus 26, according to the preferred embodiment of the present invention. System 20 includes a plurality of storage devices 22*a-d*. Each storage device preferably includes a RAID (Redundant Array of Independent/Inexpensive Disks) device comprising a plurality of magnetic disks. Other suitable storage devices can include optical, magneto-optical, magnetic tape, and semiconductor (e.g. DRAM) storage devices. Each storage device is connected to a physical storage controller 24. Physical storage controller 24 is preferably a conventional RAID controller, externally accessible as one or more logical storage devices each associated with a logical unit number (LUN). Physical storage controller 24 controls the read and write operations performed by storage devices 22. Physical storage controller 24 receives block-level storage commands, and generates device-dependent storage commands for storage devices 22*a-d*.

A special-purpose dual-mode storage controller 26 of the present invention is connected to physical storage controller 24. Dual-mode storage controller 26 is connected to a metadata network 36 over one or more metadata network connections 38. Metadata network 36 is preferably any type or combination of networks capable of supporting metadata transfer and the IP protocol, and/or any transport protocol such as TCP (Transmission Control Protocol) or UDP (User Datagram Protocol). Such networks include local area networks (LANs) such as Ethernet (e.g. Gigabit Ethernet) networks, wide area networks (WANs) such as the Internet, and direct connections such as PCI (Peripheral Component Interconnect) or SCSI (Small Computer Systems Interface) connections. A plurality of first hosts 30*a-b* are in turn connected to metadata network 36. First hosts 30*a-b* send and receive metadata storage/retrieval commands and corresponding metadata to/from dual-mode storage controller 26. Dual-mode storage controller 26 is also connected to a storage area network (SAN) 44 over a SAN connection 46. SAN 44 can be implemented using known block-level protocols such as Fibre Channel, ESCON, or FICON. A plurality of second hosts 32*a-b* are in turn connected to SAN 44. Second hosts 32*a-b* send and receive block storage/retrieval commands and corresponding block data to/from dual-mode storage controller 26.

Dual-mode storage controller 26 is further connected to a storage management device 48, for receiving storage configuration data. Storage management device 48 can be a general purpose computer (PC) running storage management software and an associated graphical user interface (GUI). Storage management device 48 can be connected to dual-mode storage controller 26 over a conventional connection such as a PCI (direct) or network connection. For example, storage management device 48 can be connected to dual-mode storage controller 26 through a SAN or IP network such as networks 36, 44, or through another network. Management device 48 can be used to assign to each host 30*a-d* logical unit numbers (LUNs) corresponding to storage devices 22*a-d*. Management device 48 preferably includes virtualization software that can be used to partition the total capacity of storage devices 22*a-d* as desired between the first set of hosts and the second set of hosts, and thus effectively assign to each host 30*a-d* desired sizes of storage space from the common storage pool controlled by physical storage controller 24. Preferably, first hosts 30*a-b* are assigned different LUNs than second hosts 32*a-b*. Management device 48 can be used to control a backup device so as to perform backup operations whenever data is written to storage devices 22*a-d*. Management device 48 can be connected to hosts 30*a-d* and physical storage controller 24 through connections other than through storage controller 26.

The configuration shown in FIG. 1 is illustrated as an example only. Other suitable configurations may include larger or smaller numbers of hosts 30*a-d* and storage devices 22*a-d*. Physical storage controller 24 can be connected to dual-mode storage controller 26 indirectly, for example over a network. The output of dual-mode storage controller 26 can be connected to a server, network, or a network monitoring device, instead of or in addition to physical storage controller 24 and storage devices 22*a-d*. A network monitoring device connected to the output of dual-mode storage controller 26 can be used to monitor locations of stored data or data storage/transfer statistics, for example. The configuration of FIG. 1 and other similar configurations allow integrating SAN and NAS storage using a single storage controller, as will be apparent from the description below.

Figure 2:
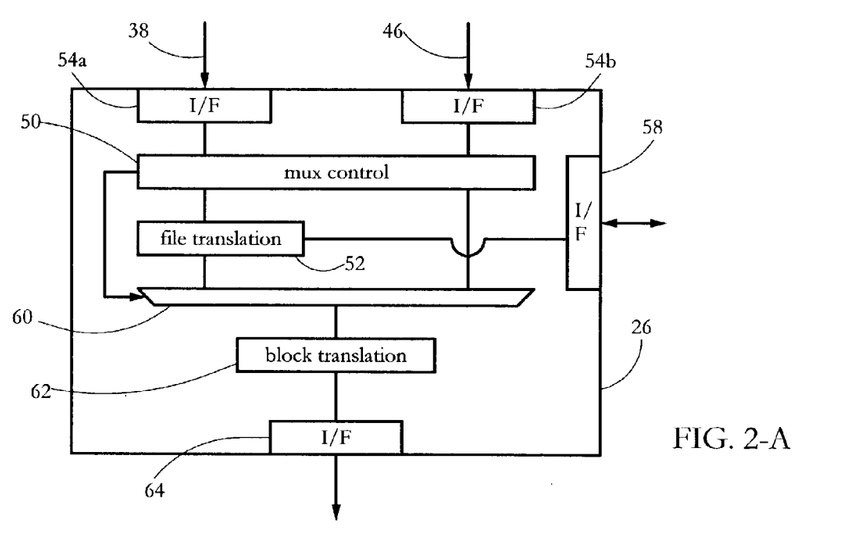

FIG. 2-A shows a schematic diagram of dual-mode storage controller 26 according to the preferred embodiment of the present invention. Storage controller 26 is integrated on a single chip, and comprises multiple dedicated hardware units or cores described below integrated on the chip. Storage controller 26 may include or be connected to RAM (e.g. DRAM), and to non-volatile memory such as flash memory for storing configuration data. Storage controller 26 comprises conventional interfaces and network interface/protocol processing logic 54*a-b* for connecting to metadata and block connections 38, 46, respectively. Network interface logic 54*a-b* implements the processing required by the network protocols employed by network connections 38, 46. Such network protocols may include Ethernet (e.g. Gigabit Ethernet) and TCP/IP for metadata connection 38, and Fibre Channel or ESCON for block connection 46.

Storage controller 26 comprises multiplexing control logic 50 connected to the output of network interface logic 54*a-b*, and to a multiplexer (multiplexing logic) 60. Multiplexing control logic 50 controls the operation of multiplexer 60, for selectively transmitting data derived from only one of network interface logic units 54*a-b* at a time. Multiplexing control logic 50 can implement any desired priority scheme defining the order of data transmission applied using multiplexer 60. The priority scheme can be fixed, or can be configured using management device 48. In one implementation, the priority scheme is a first-in first-out scheme. Multiplexing control logic 50 can include a FIFO (first in first out) buffer having its input connected to network interface logic 54*a-b*.

Storage controller 26 further comprises dedicated metadata translation (e.g. file translation) logic 52 connected to metadata network interface logic 54*a*. Metadata translation logic 52 is further connected to management device 48 (shown in FIG. 1), for receiving translation configuration data. Referring to FIG. 2-A, the output of metadata translation logic 52 is connected to a first input of multiplexer 60. A second input of multiplexer 60 is connected to the output of block network interface logic 54*b*. An output of multiplexer 60 is connected to dedicated block translation logic 62. Block translation logic 62 is in turn connected to physical storage controller 24 (shown in FIG. 1).

Metadata translation logic 52 receives metadata storage commands from metadata network interface logic 54*a*. A metadata storage command includes identifications of the metadata (e.g. file name or attributes), storage instruction (e.g. read or write file or attributes), requesting host, as well the metadata itself if the command is a write command. Metadata translation logic 52 translates each metadata storage command into a corresponding block-level storage command. The block storage command preferably includes identifications of LUN(s) corresponding to the host/metadata, block number(s) within the LUN(s), storage command, and the block data itself for write commands. Metadata translation logic 52 receives the data required for the translation operation from management device 48 and from local storage. As described above, management device 48 assigns given LUN(s) to each particular host 30*a-b*. For example, management device 48 may assign file system numbers 1, 4, and 5 to LUN5. For each LUN, metadata translation logic 52 is capable of accessing-stored data describing the correspondence between metadata and logical blocks within the LUN. The correspondence data may be stored locally, or may be provided externally, for example by management device 48. In accordance to the correspondence data, metadata translation logic 52 may then specify, for example, that a file filesystem1/filepath/filename1 is assigned logical blocks 50,000 to 55,000 in LUN5. Metadata translation logic 52 preferably implements the metadata-block correspondence according to any suitable file system scheme. In a present implementation, the metadata-block correspondence is defined according to XFS, a known, widely available file system.

Block translation logic 62 receives each block-level storage command from metadata translation logic 52, and generates a corresponding raw block number command. A raw block number can be generated for example by adding a LUN-assigned base number to an offset equal to the block number with the LUN. The offset is received from metadata translation logic 52, while the base number is stored locally within or retrieved by block translation logic 62. For example, if the offset corresponding to LUN5 is 4,000,000, block translation logic 62 may add the logical block range generated by metadata translation logic 52 (50,000 to 55,000) to the LUN offset to generate a raw (physical) block range of 4,050,000 to 4,055,000 corresponding to the file filesystem1/filepath/filename1. Physical storage controller 24 (shown in FIG. 1) can have its storage space arranged as a sequence of such raw block numbers.

The operations shown in FIG. 2-B illustrate the functioning of metadata translation logic 52 and block translation logic 62 for an exemplary file write command. Metadata translation logic 52 receives a file storage command 80 comprising an identification of a file system and associated file name/path, and the file or file attributes to be written. In the example shown in FIG. 2-B, the metadata to be stored is identified as part of filesystem1, with the location filepath/filename1. File storage command 80 is then translated by metadata translation logic 52 into a logical block storage command 82. Logical block storage command 82 comprises identifications of a LUN corresponding to the received file name and file system, a logical block number range within that LUN, and the file or attributes to be written. For example, logical block storage command 82 may contain an identification of LUN5, and logical blocks 50,000 to 55,000 within LUN5. Block translation logic 62 translates logical block storage command 82 into a physical (raw) block storage command 86 to be sent externally. Raw block storage command 86 includes an identification of a raw block number range and the data to be written. In the illustration of FIG. 2-B, raw block storage command includes a raw block range of 4,050,000 to 4,055,000.

Figure 3:
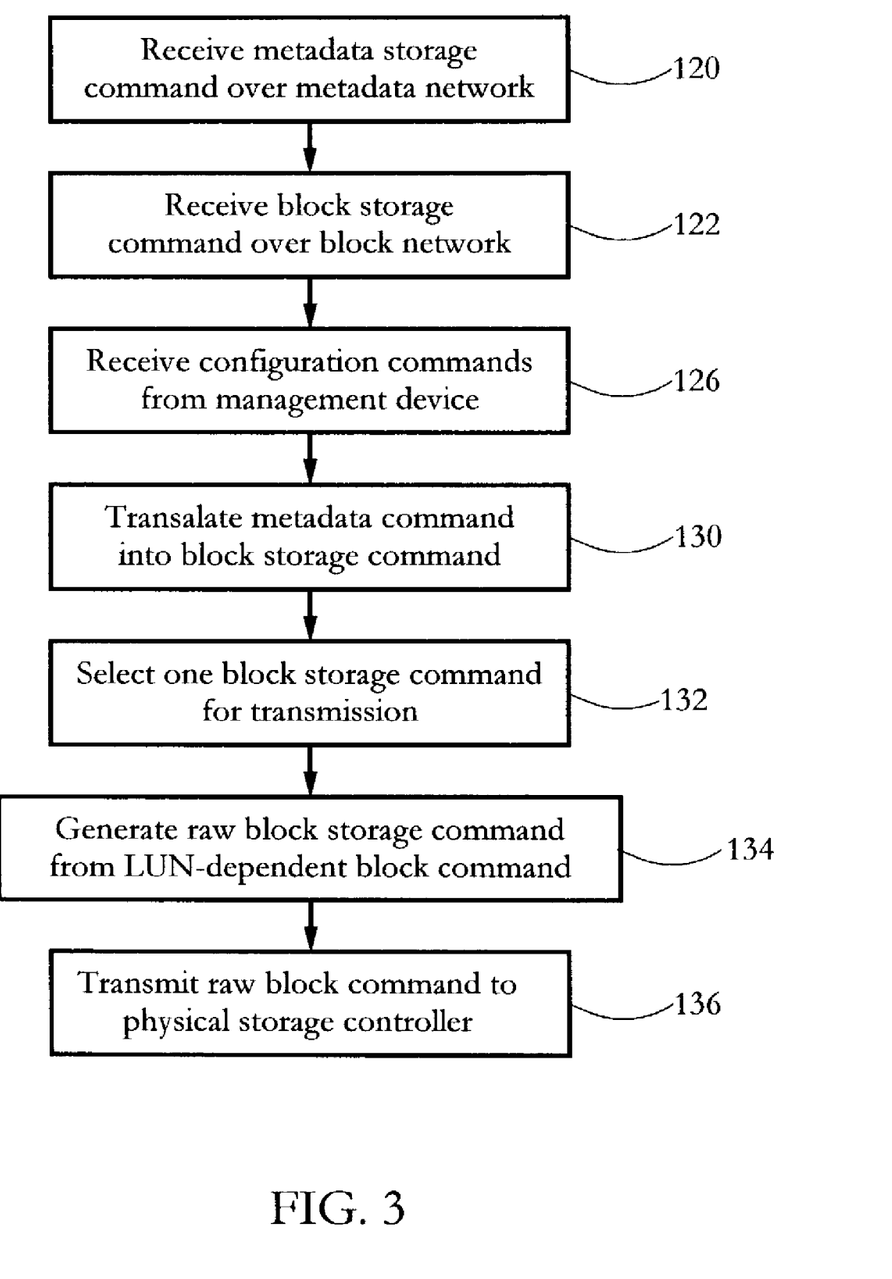
FIG. 3 shows a set of steps performed by the dual-model storage controller of FIG. 2 during its operation, according to the preferred embodiment of the present invention.

FIG. 3 illustrates schematically a network storage method implemented using the configuration of FIGS. 1 and 2, according to the preferred embodiment of the present invention. In a step 120, metadata network interface logic 54*a* receives a metadata storage command over metadata network 36. Block network interface logic 54*b* receives a logical block storage command over block network 44, as illustrated at 122 in FIG. 3. In a step 126, metadata translation logic 52 receives configuration data from management device 48. Metadata translation logic 52 then employs the configuration data to translate the metadata storage command into a corresponding logical block storage command, as shown at step 130 in FIG. 3. In a step 132, multiplexer 60 selects one block storage command from the translated block storage command and the block storage command received over block network 44 for transmission to block translation logic 62. Block translation logic 62 then generates a raw block storage command from each logical block storage command, as shown at step 134. Finally, in a step 136, each raw block storage command is transmitted sequentially to physical storage controller 24 or another external device.

Figure 4:
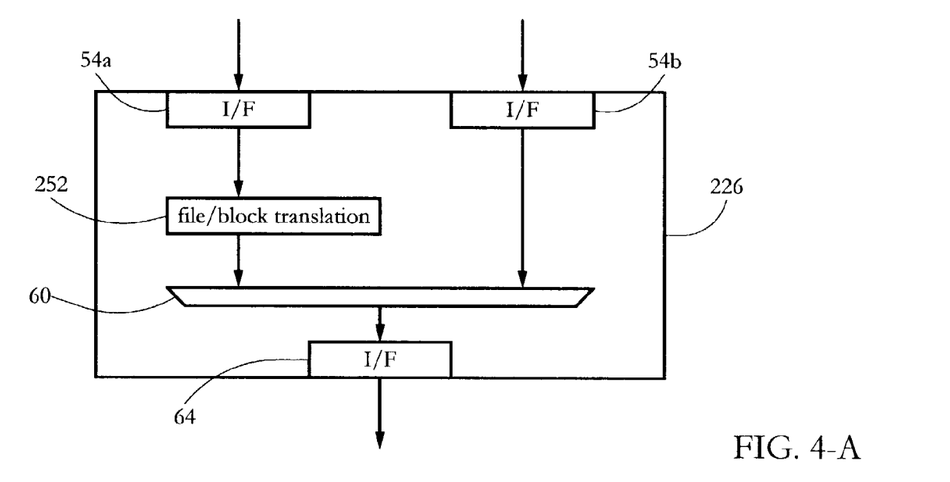

FIGS. 4-A-C illustrate the structure of dual-mode network storage controllers 226, 326, 426, respectively, according to other embodiments of the present invention. The management device interface and multiplexing control logic units of the controllers are not shown for clarity. Input interface logic 54*a-b* and output interface logic 64 are described in detail above with reference to FIG. 2-A. Referring to FIG. 4-A, dual-mode storage controller 226 comprises combined metadata/block-translation logic 252 connected between metadata input interface logic 54*a* and multiplexer 60. Translation logic 252 performs the functions described above for metadata translation logic 52 and block translation logic 62. Controller 226 is particularly suited for use in a system in which the block commands received by block interface logic 54*b* are raw block commands, requiring no additional translation before further transmission to a physical storage controller.

As shown in FIG. 4-B, dual-mode storage controller 326 comprises combined metadata/block translation logic 352 connected as described above with reference to FIG. 4-A. Dual-mode storage controller is particularly suited for use in a system in which the block commands received by block interface logic 54*b* are logical block commands requiring additional translation into raw block commands. Controller 326 comprises a second multiplexer (or multiplexing logic) 360 connected between metadata input interface logic 54*a* and translation logic 352. One input of multiplexer 360 is connected to metadata input interface logic 54*a*, while another input is connected to the output of multiplexer 60. The output of multiplexer 360 is connected to translation logic 352, for providing data to translation logic 352. A metadata command received through metadata input interface logic 54*a* passes through multiplexer 360 and is translated into a corresponding logical block storage command. The translated logical block storage command then passes through multiplexer 60, back through the second input of multiplexer 360, and is translated into a raw block storage command upon its second passage through translation logic 352. Similarly, a logical block storage command received through input block interface logic 54*b* passes sequentially through multiplexer 60 and multiplexer 360, and is then translated into a raw block storage command upon its passage through translation logic 352.

As shown in FIG. 4-C, dual-mode storage controller 426 comprises separate metadata translation logic 52 and block translation logic 62 connected through multiplexer 60 as described above with reference to FIG. 2-A. A second multiplexer (or multiplexing logic) 460. Controller 436 is particularly suited for use in a system in which the block commands received over block input interface logic 54*b* are raw block commands requiring no further translation before transmission to a physical storage controller. Multiplexer 460 is controlled such that raw block storage commands received over block input interface logic 54*b* bypass block translation logic 62.

It will be clear to one skilled in the art that the above embodiments may be altered in many ways without departing from the scope of the invention. A dual-mode network storage controller as described above can be positioned anywhere in the storage path: at the storage end of a network storage system, at one or more hosts, or in the network path between a host and the storage devices. Additional logic implementing desired functionality can be integrated on the same chip as the dual-mode storage controller. Accordingly, the scope of the invention should be determined by the following claims and their legal equivalents.

What is claimed is:

1. A dual-mode network storage control apparatus integrated on a chip, comprising:
    an input network attached storage (NAS) interface for receiving a file-level storage command from a first network client;
    file-level translation logic connected to the input NAS interface, for generating a first block storage command derived from the file-level storage command;
    an input storage area network (SAN) interface for receiving a second block storage command from a second network client; and
    a multiplexing unit having
        a first input connected to the file-level translation logic, for receiving a first block storage request derived from the first block storage command,
        a second input connected to the input SAN interface, for receiving a second block storage request derived from the second block storage command, and
        a multiplexing unit output for selectively transmitting the first block storage request and the second block storage request.

2. The apparatus of claim 1, wherein the first block storage command is a logical block storage command comprising an identification of a logical unit number and a logical block number within the logical unit number.

3. The apparatus of claim 2, further comprising block translation logic connected to the tile-level translation logic, for translating the logical block storage command into a physical block storage command comprising a raw block number.

4. The apparatus of claim 1, wherein the first block storage command is a physical block storage command comprising a raw block number.

5. The apparatus of claim 1, further comprising a management interface connected to the file-level translation logic, for supplying translation configuration data to the file-level translation logic.

6. The apparatus of claim 1, wherein the file-level storage command comprises a file storage command.

7. The apparatus of claim 1, wherein the file-level storage command comprises a URL storage command.

8. The apparatus of claim 1, wherein the input NAS interface is an Ethernet interface.

9. The apparatus of claim 1, wherein the input NAS interface is a SONET interface.

10. The apparatus of claim 1, wherein the input SAN interface is a Fibre Channel interface.

11. The apparatus of claim 1, wherein the input SAN interface is an ESCON interface.

12. The apparatus of claim 1, further comprising an output block interface connected to the multiplexing unit output, for sequentially transmitting storage requests derived from the first block storage request and the second block storage request.

13. The apparatus of claim 12, wherein the output block interface is connected to a storage device comprising a redundant array of independent disks.

14. A dual-mode storage control apparatus integrated on a chip, comprising:
    file-level translation logic integrated on the chip, for translating a file-level storage command into a first block storage command, wherein the first block storage command is a logical block storage command comprising an identification of a logical unit number and a logical block number within the logical unit number;
    multiplexing logic integrated on the chip, having a first input connected to the file-level translation logic for receiving a first block storage request derived from the first block storage command, a second input for receiving a second block storage command, and an output for sequentially transmitting the first block storage request and the second block storage command; and
    block translation logic integrated on the chip and connected to the file-level translation logic, for translating into a physical block storage command comprising a raw block number.

15. A dual-mode storage control apparatus integrated on a chip, comprising:
    file-level translation logic integrated on the chip, for translating a file-level storage command into a first block storage command; and
    multiplexing logic integrated on the chip, having a first input connected to the file-level translation logic for receiving a first block storage request derived from the first block storage command, a second input for receiving a second block storage command, and an output for sequentially transmitting the first block storage request and the second block storage command;
    wherein the first block storage command is a physical block storage command comprising a raw block number.

16. The apparatus of claim 15, further comprising a management interface connected to the file-level translation logic, for supplying translation configuration data to the file-level translation logic.

17. A dual-mode storage system comprising:
    a storage device;
    a first network storage client;
    a second network storage client;
    a network storage controller connected to the storage device over a block-level storage connection, connected to the first client over a file-level network storage connection, and connected to the second client over a block-level network storage connection, wherein the network storage controller comprises
        file-level translation logic integrated on a chip, for translating a file-level storage command received from the first client into a first block storage command, and
        multiplexing logic integrated on the chip, for selectively transmitting one of a
        first block storage request derived from the first block storage command and a second block storage request derived from a second
        block storage command at a time to the storage device, the second
        block storage command originating from the second client.

18. The apparatus of claim 17, wherein the file-level network storage connection comprises an Ethernet connection.

19. The system of claim 17, wherein the file-level network storage connection comprises a SONET connection.

20. The system of claim 17, wherein the block-level storage connection comprises a Fibre Channel connection.

21. The system of claim 17, wherein the block-level storage connection comprises an ESCON connection.

22. The system of claim 17, wherein the storage device comprises a redundant array of independent disks.

23. A dual-mode network storage control apparatus integrated on a chip, comprising:
  input network attached storage (NAS) interface means for receiving a file-level storage command from a first network client;
  translation means connected to the input NAS interface means, for translating the file-level storage command into a corresponding first block storage command;
  input storage area network (SAN) interface means for receiving a second block storage command from a second network client;
  multiplexing means having
    a first input connected to the translation means, for receiving a first block storage request derived horn the first block storage command,
    a second input connected to the input SAN interface means, for receiving a second block storage request derived from the second block storage command, and
    a multiplexing output for selectively transmitting the first block storage request and the second block storage request.

24. The apparatus of claim 23, further comprising output block interface means lo the multiplexing output, for sequentially transmitting storage requests derived from the first block storage request and the second block storage request.

25. A dual-mode network storage method comprising:
  receiving a file-level storage command from a first network client to file-level translation logic integrated on a chip;
  employing the file-level translation logic to translate the file-level storage command into a corresponding first block storage command, wherein the first block storage command is a logical block storage command comprising an identification of a logical unit number and a logical block number within the logical unit number;
  receiving a second block storage command from a second network client;
  employing multiplexing logic integrated on the chip to multiplex a first block storage request derived from the first block storage command and a second block storage request derived from the second block storage command; and
  translating the logical block storage command into a physical block storage command comprising a raw block number.

26. A dual-mode network storage method comprising:
  receiving a file-level storage command from a first network client to file-level translation logic integrated on a chip;
  employing the file-level translation logic to translate the file-level storage command into a corresponding first block storage command;
  receiving a second block storage command from a second network client; and
  employing multiplexing logic integrated on the chip to multiplex a first block storage request derived from the first block storage command and a second block storage request derived from the second block storage command;
  wherein the first block storage command is a physical block storage command comprising a raw block number.

27. The method of claim 26, further comprising a management interface connected to the file-level translation logic, for supplying translation configuration data to the file-level translation logic.

28. A dual-mode, storage area network (SAN) and network attached storage (NAS) storage controller integrated circuit comprising:
  a SAN interface connected to a storage area network;
  a NAS interface connected to a file-level data network;
  a storage-side interface connected to a storage device; and
  logic connected to the storage-side interface for transmitting to the storage-side interface a first set of block-level storage commands derived from block-level client commands received over the storage area network, and a second set or block-level storage commands derived from file-level client commands received over the file-level data network.

* * * * *